(12) United States Patent
Adefris et al.

(10) Patent No.: US 6,645,624 B2
(45) Date of Patent: Nov. 11, 2003

(54) COMPOSITE ABRASIVE PARTICLES AND METHOD OF MANUFACTURE

(75) Inventors: Negus B. Adefris, Woodbury, MN (US); William D. Joseph, Maplewood, MN (US); Kathleen A. Wagle-Peterson, Oakdale, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/942,007

(22) Filed: Aug. 29, 2001

(65) Prior Publication Data

US 2002/0090891 A1 Jul. 11, 2002

Related U.S. Application Data

(60) Provisional application No. 60/247,074, filed on Nov. 10, 2000.

(51) Int. Cl.[7] ............................................. B32B 5/16
(52) U.S. Cl. ...................... 428/402; 428/403; 428/404; 428/407; 51/307; 51/309
(58) Field of Search ...................... 428/402, 403, 428/404, 407; 51/307, 309

(56) References Cited

U.S. PATENT DOCUMENTS

| | | |
|---|---|---|
| 1,910,444 A | 5/1933 | Nicholson |
| 3,041,156 A | 6/1962 | Rowse et al. |
| 3,188,265 A | 6/1965 | Charbonneau et al. |
| 3,502,453 A | 3/1970 | Baratto |
| 3,874,856 A | 4/1975 | Leeds |
| 3,916,584 A | 11/1975 | Howard et al. |
| 3,928,949 A | 12/1975 | Wagner |
| 4,112,631 A | 9/1978 | Howard |
| RE29,808 E | 10/1978 | Wagner |
| 4,132,533 A | 1/1979 | Lohmer et al. |
| 4,311,489 A | 1/1982 | Kressner |
| 4,355,489 A | 10/1982 | Heyer et al. |
| 4,364,746 A | 12/1982 | Bitzer et al. |
| 4,393,021 A | 7/1983 | Eisenberg et al. |
| 4,407,967 A | 10/1983 | Luks |
| 4,486,200 A | 12/1984 | Heyer et al. |
| 4,541,842 A * | 9/1985 | Rostoker |
| 4,562,275 A | 12/1985 | Speer et al. |
| 4,563,388 A | 1/1986 | Bonk et al. |
| 4,652,274 A | 3/1987 | Boettcher et al. |
| 4,652,275 A | 3/1987 | Bloecher et al. |
| 4,749,617 A | 6/1988 | Canty |
| 4,799,939 A | 1/1989 | Bloecher et al. |
| 4,903,440 A | 2/1990 | Kirk et al. |
| 4,906,523 A | 3/1990 | Bilkadi et al. |
| 4,918,874 A | 4/1990 | Tiefenbach, Jr. |
| 4,933,234 A | 6/1990 | Kobe et al. |
| 4,997,461 A | 3/1991 | Markhoff-Matheny et al. |
| 5,009,675 A | 4/1991 | Kunz et al. |
| 5,011,508 A | 4/1991 | Wald et al. |
| 5,028,483 A | 7/1991 | Chernega et al. |
| 5,042,991 A | 8/1991 | Kunz et al. |
| 5,057,371 A | 10/1991 | Canty et al. |
| 5,061,294 A | 10/1991 | Harmer et al. |
| 5,085,671 A | 2/1992 | Martin et al. |
| 5,137,542 A | 8/1992 | Buchanan et al. |
| 5,178,644 A | 1/1993 | Huzinec |
| 5,203,884 A | 4/1993 | Buchanan et al. |
| 5,213,591 A | 5/1993 | Celikkaya et al. |
| 5,236,472 A | 8/1993 | Kirk et al. |
| 5,318,604 A | 6/1994 | Gorsuch et al. |
| 5,378,252 A | 1/1995 | Follensbee |
| 5,417,726 A | 5/1995 | Stout et al. |
| 5,429,648 A | 7/1995 | Wu |
| 5,549,962 A | 8/1996 | Holmes et al. |
| 5,550,723 A | 8/1996 | Ulman |
| 5,733,178 A | 3/1998 | Ohishi |
| 5,958,794 A | 9/1999 | Bruxvoort et al. |
| 5,975,988 A | 11/1999 | Christianson |
| 6,056,794 A * | 5/2000 | Stoetzel ................. 51/295 |
| 6,096,107 A | 8/2000 | Caracostas et al. |
| 6,171,224 B1 | 1/2001 | Phillips |
| 6,589,305 B1 * | 7/2003 | Rosenflanz ............. 51/309 |

FOREIGN PATENT DOCUMENTS

| | | |
|---|---|---|
| EP | 0 601 594 A1 | 6/1994 |
| JP | 62-79841 | 4/1987 |
| WO | WO 92/09543 | 6/1992 |
| WO | WO 93/12911 | 7/1993 |
| WO | WO 95/11774 | 5/1995 |
| WO | WO 95/19871 | 7/1995 |
| WO | WO 99/51400 | 10/1999 |
| WO | WO 01/08880 A1 | 8/2001 |

* cited by examiner

*Primary Examiner*—Leszek Kiliman
(74) *Attorney, Agent, or Firm*—Colene H. Blank

(57) ABSTRACT

The present application discloses an agglomerate. The agglomerate comprises a crystalline matrix. The agglomerate may additionally comprise abrasive particles. The agglomerate has a normalized bulk density of less than about 0.38.

The present application additionally discloses a method of manufacturing the agglomerate. The agglomerate is manufactured by forming a mixture comprising an abrasive particle with a sol, the sol comprising an oxide and water and introducing the mixture into a spray dryer. The mixture is then dried in the spray dryer. The mixture is then fired, for example in an oven. The resulting agglomerates comprise abrasive particles retained within a crystalline matrix of the oxide.

The present invention additionally discloses methods of using the agglomerates of the resent invention.

17 Claims, No Drawings

COMPOSITE ABRASIVE PARTICLES AND METHOD OF MANUFACTURE

This application claims priority to the U.S. Provisional Application No. 60/247,074 filed Nov. 10, 2000.

FIELD OF THE INVENTION

This invention is directed to composite abrasive particles, also known as agglomerates, and their uses. Specifically, the invention discloses abrasive agglomerates comprising abrasive particles and a crystalline matrix, abrasive articles comprising the agglomerates, methods of manufacturing such abrasive agglomerates and articles, and methods of using such abrasive articles.

BACKGROUND OF THE INVENTION

Abrasive articles comprising abrasive particles are used to abrade and/or modify the surface of a wide variety of materials, commonly referred to as workpieces, in a wide variety of applications. These applications range from high pressure, high stock removal of metal forgings to polishing eyeglasses. There are a variety of abrasive particles (e.g., diamond particles, cubic boron nitride particles, fused abrasive particles (including fused alumina, heat treated fused alumina, fused alumina zirconia, and the like), and sintered, ceramic abrasive particles (including sol-gel-derived abrasive particles) known in the art. In some abrading applications, the abrasive particles are used in loose form (a slurry), while in others the particles are incorporated into abrasive products (including: bonded abrasives, coated abrasives and nonwoven abrasives). Bonded abrasives typically comprise a plurality of abrasive particles bonded together to form a shaped mass. Coated abrasives typically comprise a plurality of abrasive particles bonded to a backing. Nonwoven abrasives typically comprise a plurality of abrasive particles bonded onto and into a lofty, porous, nonwoven substrate. Typical bonding materials for bonded abrasives are organic binders, vitreous binders, and metallic binders, while for coated and nonwoven abrasives they are typically organic binders. Criteria used in selecting abrasive particles used for a particular abrading application typically include: abrading life, rate of cut, substrate surface finish, grinding efficiency, and product cost.

Abrasive particles have a wide range of properties that provide for their application in the abrasives industry. The selection of a particular type of abrasive particle generally depends on the physical properties of the particles, the workpiece to be abraded, the desired resulting surface condition, the performance properties of the abrasive particles, and the economics of selecting a particular abrasive particle for a specific application.

Aluminum oxide, or alumina, is one of the most popular abrasive particles used in the production of coated abrasives, e.g., sandpaper. Alumina is used for many applications, such as paint sanding, metal grinding, and plastic polishing. Silicon carbide, also a popular abrasive, is generally known as a sharper mineral than alumina, and is used mainly in woodworking, paint, and glass grinding applications. Diamond and cubic boron nitride, commonly called "superabrasives," are used to abrade very hard workpieces such as hardened steel, ceramic, cast iron, silicon wafers and stone. Diamond is typically the used for non-ferrous materials, while cubic boron nitride is typically used for ferrous materials like hardened steel. However, superabrasives such as diamond and cubic boron nitride can cost up to 1000 times more than conventional abrasive particles, i.e., aluminum oxide, and silicon carbide. Therefore, it is desirable to utilize the superabrasives to their full extent.

Agglomerates are composite particles of a plurality of abrasive particles bonded together by a binder matrix. During use, the agglomerates typically erode or break down and expel used single abrasive particles to expose new abrasive particles. Agglomerates can be used in abrasive articles such as coated abrasives, non-woven abrasives, and abrasive wheels and provide a long useful life of the abrasive article and efficient use of the abrasive particles.

Agglomerates have been developed to address inconsistent cut rates with time (see, e.g., U.S. Pat. No. 3,928,949 (Wagner), U.S. Pat. No. 4,132,533 (Lohmer), U.S. Pat. No. 4,311,489 (Kressner), U.S. Pat. No. 4,393,021 (Eisenberg), U.S. Pat. No. 4,562,275 (Bloecher et al.), U.S. Pat. No. 4,799,939 (Bloecher et al.), U.S. Pat. No. 5,318,604 (Gorsuch), U.S. Pat. No. 5,550,723 (Holmes et al.), and U.S. Pat. No. 5,975,988 (Christiansen)), which are all herein incorporated in their entirety by reference. In the case of coated abrasives, these agglomerates are bonded to the backing to form an abrasive article.

U.S. Pat. No. 4,311,489 to Kressner, discloses a coated abrasive product having abrasive particles secured to a flexible backing by maker and size coats, each abrasive particle consisting essentially of an agglomerate of fine abrasive grains having an average diameter less than about 200 microns and an inorganic, brittle, matrix.

U.S. Pat. No. 3,916,584 to Howard et al., incorporated herein in its entirety by reference, discloses composite abrasive granules, in which fine, hard abrasive grains are distributed throughout a relatively softer metal oxide matrix.

U.S. Pat. No. 4,918,874 to Tiefenbach, discloses a method of preparing abrasive articles exhibiting improved homogeneity and breakdown properties.

U.S. Pat. No. 5,975,988 to Christianson discloses a coated abrasive having a backing and an abrasive layer coated on the first major surface of the backing, wherein a cross-section of the abrasive layer normal to the thickness and at a center point of the thickness has a total cross-sectional area of abrasive agglomerates which is substantially the same as that at a point along the thickness which is 75% of a distance the same as that at a point and the contact side; a coated abrasive article having a bond system with a Knoop hardness number of at least 70.

What has been desired is an agglomerate and a method of manufacturing the agglomerate which would allow for good grinding performance (e.g., long life, high cut rates, consistent cut rates, consistent surface finish and the like) in all abrasive applications. It has been desired for agglomerates to furnish fresh abrasive particles to the working surface throughout the life of the agglomerate. Additionally, it is desirable to manufacture the agglomerates in such a way to control the porosity of the agglomerate.

SUMMARY OF THE INVENTION

The present application discloses an agglomerate. The agglomerate comprises a crystalline matrix. The agglomerate may additionally comprise abrasive particles. The agglomerate has a normalized bulk density of less than about 0.38.

The present application additionally discloses a method of manufacturing the agglomerate. The agglomerate is manufactured by forming a mixture comprising an abrasive particle with a sol, the sol comprising an oxide and water and introducing the mixture into a spray dryer. The mixture is then dried in the spray dryer. The mixture is then fired, for example in an oven. The resulting agglomerates comprise abrasive particles retained within a crystalline matrix of the oxide.

The present invention additionally discloses methods of using the agglomerates of the resent invention.

In this application:

"Agglomerate" means, without limitation, composite abrasive agglomerates of fired greenware agglomerates. The agglomerates comprise abrasive particles in a matrix as described herein.

"Normalized bulk density" means the bulk density measurement divided by the theoretical density. The theoretical density is calculated by summing the volume fraction of the densities of each component. One skilled in the art of sampling is able to take a sample without affecting the outcome.

Agglomerates according to the present invention may be incorporated into various abrasive articles such as coated abrasives, bonded abrasives (including vitrified and resinoid grinding wheels) and three-dimensional fixed abrasives. The abrasive articles typically comprise agglomerates according to the present invention and binder.

Typically, agglomerates according to the present invention are sufficiently porous to advantageously allow binder to penetrate therein. Porosity also helps swarf removal, which assists in performance of an abrasive article. "Swarf" means the abraded material of a workpiece. This feature is particularly advantageous for coated, bonded and three dimensional fixed abrasive articles. Additionally, abrasive agglomerates according to the present invention can have a long abrading life and relatively consistent cut rate. In another aspect, embodiments of agglomerate according to the present invention may be made having a desired level of porosity and/or bond strength between abrasive particles in order to provide preferential wearing of the agglomerate. The desired porosity of the matrix material maximizes the erodability the abrasive particles once they have dulled, yet it still has enough matrix material to hold the abrasive particles together as an agglomerate. Such preferential wear of the agglomerate may be particularly desirable for bonded abrasive articles. Abrasive articles made from the agglomerate of the invention may be used in both wet and dry processes. In wet abrasive processes, the porosity of the abrasive agglomerates additionally assists in lubricant and coolant transport to the interface of the abrasive and the working surfaces.

DETAILED DESCRIPTION OF THE INVENTION

Agglomerates

Details regarding abrasive agglomerates may be found, for example, in U.S. Pat. No. 4,311,489 (Kressner), U.S. Pat. No. 4,652,275 (Bloecher et al.), U.S. Pat. No. 4,799,939 (Bloecher et al.), U.S. Pat. No. 5,549,962 (Holmes et al.), and U.S. Pat. No. 5,975,988 (Christianson), the disclosures of which are incorporated herein in their entirety by reference.

The agglomerate of the present invention comprises a crystalline matrix. The crystalline matrix exists in a crystalline, non-vitreous state. The crystalline state may be polycrystalline. Generally, the crystalline matrix is at least about 80% crystalline. In specific embodiments, the crystalline matrix is 100% crystalline. The crystalline matrix may be formed of any metal oxide. For example, the crystalline matrix may be formed of alumina, silica, zinc oxide, titanium oxide, and combinations thereof. In certain embodiments, the crystalline matrix is crystalline silica.

The agglomerate of the invention may also comprise abrasive particles dispersed within the crystalline matrix. In certain embodiments, the abrasive particles are distributed uniformly throughout the crystalline matrix. The abrasive particles may be selected from any abrasive particles. For example, the abrasive particle may be silicon carbide, aluminum oxide, boron carbide, cerium oxide, zirconium oxide as well as other abrasive particles and combinations thereof. In specific embodiments, the abrasive particles comprise abrasive particles with a Mohs hardness of greater than 5. In selected embodiments, the abrasive particles are hard abrasive particles known as superabrasives. For example, the abrasive particle may be diamond or cubic boron nitride. In specific embodiments, the abrasive particle is diamond. Certain abrasive particles have a mean size no greater than about 15 micrometers. Specific abrasive particles have a mean size no greater than about 10 micrometers, for example no greater than about 7 micrometers. Depending on the intended application, the abrasive particles may have a mean diameter of no greater than 1 micrometer. If more than one abrasive particle is used, the individual abrasive particles may have the same average particle size, or may have different average particle sizes.

In some embodiments, the crystalline matrix is sufficiently abrasive to satisfy abrasion requirements for a specific use. Generally, the crystalline matrix comprises about 40% to about 100% by volume of the solids in the agglomerate (excluding the pore volume). In certain embodiments, the crystalline matrix comprises about 50% to about 80% by volume of the solids, for example about 55% to about 70% by volume of the solids. In other examples the crystalline matrix comprises about 80% to about 100% of the volume of the solids. The abrasive particles comprise about 0% to about 60% by volume of the solids of the agglomerate. In certain embodiments, the abrasive particles comprises about 20% to about 50% by volume of the solids, for example about 30% to about 45% by volume of the solids.

The agglomerates of the present invention have a normalized bulk density of less than about 0.38. In certain embodiments the normalized bulk density is between about 0.19 and about 0.35. In specific embodiments, the normalized bulk density is about 0.25 to about 0.31. The normalized bulk density measurement demonstrates that the agglomerate has a high porosity within the crystalline matrix. The porosity of the matrix allows for abrasive particles to erode from the agglomerate after their useful life has ended.

The agglomerates of the present invention may have any shape. In specific embodiments, the agglomerates are spherical. In such embodiments, the spherical agglomerates have a diameter of no greater than about 80 micrometers. In specific embodiments, the spherical agglomerates have a diameter of about 5 micrometers to about 60 micrometers.

Method of Manufacture

The present invention provides for the manufacture of abrasive agglomerates described above.

Manufacture of the Agglomerate

The agglomerate is formed by forming a mixture comprising an abrasive particle with a sol comprising a dispersion of an oxide, such as silica, in water. The mixture is spray-dried to form abrasive agglomerates, for example, in a Mobile Miner 2000 centrifugal atomizer obtained from Niro Corporation of Soeborg, Denmark. The loose agglomerates are then fired to drive off any additional liquids.

Raw Materials

1. Crystalline Matrix Material

The crystalline matrix is formed by a crystalline matrix material. Such a material may be an aqueous sol. In certain embodiments, the sol is a suspension of an oxide in water. Examples of oxides suitable for the present invention include silica, alumina, zirconia, chromia, antimony pentoxide, vanadia, ceria, or titania. In specific embodiments, the oxide is alumina, silica, titanium oxide, or zinc oxide. The crystalline matrix material may also be a combination of more than one oxide. Generally, alkali metal oxides are not beneficial to the present invention. In specific embodiments, the sol is a suspension of silica in water. Any kind of aqueous silica suspension may be employed, such as an aqueous suspension of precipitated silica, a colloidal silica suspension (commonly called a silica sol), or an aqueous suspension of silica compounds including predominantly silica.

When the oxide particles are dispersed in water, the particles are stabilized by common electrical charges on the surface of each particle, which tends to promote dispersion rather than agglomeration. The like charged particles repel one another, thereby minimizing aggregation of the particles.

Colloidal silicas suitable for this invention are available commercially under such trade names as "LUDOX" (E. I. Dupont de Nemours and Co., Inc. Wilmington, Del.), "NYACOL" (Nyacol Co., Ashland, Mass.), and "NALCO" (Nalco Chemical Co., Oak Brook, Ill.). Non-aqueous silica sols (also called silica organosols) are also commercially available under such trade names as "NALCO 1057" (a silica sol in 2-propoxyethanol, Nalco Chemical Co.), and "MA-ST", "IP-ST", and "EG-ST" (Nissan Chemical Industries, Tokyo, Japan). Sols of other oxides are also commercially available, e.g., "NALCO ISJ-614" and "NALCO ISJ-613" alumina sols, and "NYACOL 10/50" zirconia sol. These colloidal sols can contain anywhere from about 10 to 85% by weight water, typically between 25 to 60% by weight water. Two or more different colloidal silicas can also be used.

2. Abrasive Particles

Certain embodiments of the agglomerates of the present invention comprise abrasive particles. The abrasive particles are detailed above when describing the agglomerates. The abrasive particles generally are resistant to the liquid medium, for example water in the aqueous sol, such that their physical properties do not substantially degrade upon exposure to the liquid medium. Suitable abrasive particles are typically inorganic abrasive particles.

3. Optional Additives

The method of manufacture of the present invention may additionally include certain optional additives. Such additives may include pore formers, grinding aids and polishing aids. Pore formers can be any temporary polymer with sufficient stiffness to keep pores from collapsing. For example, the pore former may be polyvinyl butyrate, polyvinyl chloride, wax, sodium diamyl sulfosuccinate, and combinations thereof. In certain embodiments, the pore former additive is sodium diamyl sulfosuccinate in methyl ethyl ketone.

In certain embodiments, the raw materials are substantially free of a material that promotes flow of the crystalline matrix, for example lithium fluoride.

Blending

The raw materials are blended to form a mixture. The blending can take place in any of an assortment of different apparatus that provide physical agitation. The physical agitation may be accomplished with mechanical, electrical or magnetic (sonic) methods. For example, the mixture can be formed in an air or electric impeller mixer, a ball mill, or an ultrasonic mixer. However, any mixing apparatus may be employed.

In specific embodiments, the raw materials are blended in an ultrasonic bath for at least about 20 minutes, specifically between about 25 and about 35 minutes. In certain embodiments, such as the silica and diamond embodiment shown in the examples, the raw materials are blended for about 30 minutes. Those skilled in the art will recognize that the mixture times may be adjusted for different embodiments. Such adjustments are within the skill of those in the art.

Drying

The mixture is then subjected to a drying step. In the present invention, the drying step is carried out in a spray dryer equipped with an atomizing device to produce droplets of the mixture. The spray dryer of the present invention may be, for example, a centrifugal atomizer, or a dual nozzle atomizer. An example of a centrifugal atomizer spray dryer is a Mobile Miner 2000 centrifugal atomizer obtained from Niro Corporation of Soeborg, Denmark. The centrifugal atomizer wheel may be driven at a nominal rotational speed of about 25,000 to about 45,000 rpm. In specific embodiments, the atomizer wheel is driven at about 37,500 rpm. Hot air is then introduced in the spray dryer at a temperature of at least about 200° C. In certain embodiments, the hot air is between about 200° C. and about 350° C. In specific embodiments, hot air at a temperature of about 200° C. is then exposed to the mixture. The spray dryer may be co-current or counter-current. In a co-current spray dryer, the air and the mixture flow in the same direction. In a counter-current spray dryer, the air and the mixture flow in opposing directions. The outlet temperature, measured at the outlet of the atomizing chamber may be maintained at about 95° C. The feed flow rate of the mixture was about 50 ml/min to about 70 ml/min, and is used to control the temperature inside the spray dryer. If the outlet temperature is too high, then a higher flow of the mixture is employed to reduce the temperature in the spray dryer. If the temperature is too low, then the flow rate of the mixture is lowered. Those skilled in the art will recognize that the settings disclosed, such as the atomizer wheel rotational speed, the hot air temperature, the outlet temperature and the feed flow rate may be adjusted for different embodiments. Such adjustments are within the skill of those in the art.

Firing

The dried mixture is removed from the spray dryer using a jar attached to a cyclone at a point beyond the location where the outlet temperature is measured. At this point, the mixture is in the form of loose greenware agglomerates. The greenware agglomerates are fired after removal from the spray dryer while loose (i.e. uncompressed).

In certain embodiments, such as the silica and diamond embodiment shown in the Examples, the temperature is raised at a rate of 1.5° C./minute until the temperature is at least about 350° C. The greenware agglomerates are maintained at that temperature for about 1 hour. The temperature is the further raised at a rate of 1.5° C./minute until the temperature is at least about 500° C. The greenware agglomerates are maintained at that temperature for about 1 additional hour. Those skilled in the art will recognize that the firing temperatures and times may be adjusted for different embodiments. Such adjustments are within the skill of those in the art. After the firing stage, the greenware agglomerates become agglomerates.

Abrasive Articles

The agglomerates are useful in the manufacture of abrasive articles. The above described agglomerates are also useful in the manufacture of three dimensional fixed abrasives and coated abrasives. Examples of such abrasive products are disclosed in U.S. Pat. No. 5,958,794 to Bruxvoort et al., which is herein incorporated by reference in its entirety.

Bonded Abrasive Articles

Bonded abrasives are three dimensional in structure. The ideal bonded abrasive abrades the workpiece and when the abrasive particles are worn and dulled, these abrasive particles are expelled from the bonded abrasive to expose new, fresh cutting abrasive particles. Inadequate adhesion between the abrasive particles and the bond material, can lead to premature release of the abrasive particles from the abrasive article. If the abrasive particles are prematurely released, the resulting bonded abrasive life is typically less than desired. What is desired in the industry is a bonded abrasive that exhibits good adhesion between the abrasive particles and the bond material.

Three Dimensional Fixed Abrasive Articles

The three-dimensional fixed abrasive article is generally long lasting, e.g., the abrasive article should be able to complete at least two, for example at least 5 or at least 20 and in certain embodiments at least 30 processes. The abrasive article should provide a good cut rate. The materials, desired texture, and process used to make the abrasive article all influence whether or not these criteria are met.

The fixed abrasive article may contain a backing. In general, the abrasive particles are dispersed in a binder to form an abrasive coating and/or abrasive composites bonded to a backing. In certain embodiments, abrasive composites are pyramids. There are recesses or valleys between adjacent abrasive composites. There is also more than one row of pyramidal abrasive composites shown in which the second row of abrasive composites is offset from the first row. Abrasive composites comprise a plurality of abrasive agglomerates dispersed in binder. Optionally, the fixed abrasive article does not have to have a separate backing.

The term "three-dimensional" is used such that there are numerous abrasive particles throughout at least a portion of the thickness of the abrasive article. The three-dimensional nature provides a long-lasting abrasive article, since there are plentiful abrasive particles to accomplish any process.

The abrasive article also has a "texture" associated with it; i.e. it is a "textured" abrasive article. For example, pyramid-shaped composites are raised portions and the valleys between the pyramids are the recessed portions.

Generally, the abrasive article be erodible, i.e., able to wear away controllably with use. Erodibility is desired because it results in worn abrasive particles being expunged from the abrasive article to expose new abrasive particles. If the abrasive coating is not erodible, the worn abrasive particles may not properly be discharged from the abrasive article, in which case fresh abrasive particles will not be exposed. If the abrasive coating is too erodible, abrasive particles may be expelled too fast, which may result in an abrasive article with shorter than desired product life.

The degree of erodibility is also a function of the surface texture, the abrasive coating composition, the processing conditions and the composition of the workpiece. There are many ways of endowing an abrasive product with erodibility, as will be described below. The abrasive article of the invention may have many shapes, for example circular discs, abrasive tape rolls, or abrasive belts.

A three-dimensional, textured, fixed abrasive article is generally prepared by forming a slurry containing a mixture of a binder precursor and a plurality of abrasive particles or the abrasive agglomerates described above. The slurry is applied onto a production tool having cavities that are the negative of the desired shape of the textured surface. A backing is brought into contact with the exposed surface of the production tool such that the slurry wets the surface of the backing. Then, the binder can be at least partially solidified, cured, or gelled. The abrasive article is then removed from the production tool and fully cured if it was not fully cured in the previous step. Alternatively, the slurry can be applied onto the surface of the backing and then the production tool can be brought into contact with the slurry on the backing. The abrasive coating thus comprises a plurality of abrasive "composites" on a backing.

The three-dimensional, textured, fixed abrasive article may also be formed by coating the slurry on to a backing having a contour generally corresponding to the desired shape of the textured surface. The slurry is cured in such a manner that the cured abrasive coating will have a textured surface corresponding generally to the contour of the backing. In one aspect of this method, an embossed backing is provided to make the abrasive article.

Certain modifications may be made in the three-dimensional, textured, fixed abrasive article to improve or otherwise alter performance. For example, the abrasive article may be perforated to provide openings through the abrasive layer and/or the backing to permit the passage of fluids before, during or after use.

Coated Abrasive Articles

Coated abrasives typically comprise a plurality of abrasive particles bonded to a backing. Certain coated abrasives contain abrasive agglomerates bonded to a backing. Nonwoven abrasives typically comprise a plurality of abrasive particles bonded onto and into a lofty, porous, nonwoven substrate. Typically, the agglomerates are bonded to the backing using a binder, for example organic binders, vitreous binders, and metallic binders. Criteria used in selecting abrasive particles used for a particular abrading application typically include: abrading life, rate of cut, substrate surface finish, grinding efficiency, and product cost.

Coated abrasives tend to be "more flexible" than bonded abrasives; thus coated abrasives are widely utilized where the abrasive article needs to conform to the workpiece surface. Coated abrasives tend to have one or several layers of abrasive particles. Generally these abrasive particles are oriented to enhance their cutting ability. However in some instances during the initial abrading, coated abrasives provide relatively very high cut rates. With time, the cut rate diminishes until the coated abrasive no longer provides acceptable cut rates.

A coated abrasive product typically comprises a flexible backing material that is overcoated with an abrasive layer comprised of abrasive particles and a cured binder material. It is customary to make some coated abrasives by applying a make or maker coat of a binder precursor to the backing, applying abrasive particles to the make coat while it is sufficiently tacky to adhere to the abrasive particles and then overcoating the make coat containing the abrasive particles with a size coating. The make coating may be partially cured prior to application of the size coating but once the size coating is applied, it is typical to fully cure both the make and size coating so that the resultant coated abrasive product can be employed as an abrasive material. Thereafter, the coated abrasive material is converted into various abrasive products by cutting the material into a desired shape.

A variety of backing materials are useful in the manufacture of coated abrasive products. The selection of backing material is typically made based upon the intended use of the product. Material such as paper, fabric (either nonwoven or woven), plastic film or combinations of these materials have been employed.

Abrasive Article Components

A. Binders

1. Organic Binders

Organic binders for the abrasive articles of this invention are formed from an organic binder precursor. The organic binder precursor is typically in a flowable state. The binder is typically in solid, non-flowable state. The binder can be formed from a thermoplastic material. Alternatively, the binder can be formed from a material that is capable of being crosslinked. It is also within the scope of this invention to have a mixture of a thermoplastic binder and a crosslinked binder. During the process to make the abrasive article, the binder precursor is exposed to the appropriate conditions to solidify the binder. For crosslinkable binder precursors, the binder precursor is exposed to the appropriate energy source to initiate the polymerization or curing and to form the binder.

In certain embodiments, the binder precursor is an organic material that is capable of being crosslinked. Binder precursors can be either a condensation curable resin or an addition polymerizable resin. The addition polymerizable resins can be ethylenically unsaturated monomers and/or oligomers. Examples of useable crosslinkable materials include phenolic resins, bismaleimide binders, vinyl ether resins, aminoplast resins having pendant alpha, beta unsaturated carbonyl groups, urethane resins, epoxy resins, acrylate resins, acrylated isocyanurate resins, urea-formaldehyde resins, isocyanurate resins, acrylated urethane resins, acrylated epoxy resins, or mixtures thereof. In specific embodiments, the binder is a urethane phenoxy resin system. In such embodiments, the binder may be crosslinked by isocyanate.

2. Condensation Curable Binders

Phenolic resins are widely used as abrasive article binders because of their thermal properties, availability, cost and ease of handling. There are two types of phenolic resins, resole and novolac. Resole phenolic resins have a molar ratio of formaldehyde to phenol, of greater than or equal to one, typically between 1.5:1.0 to 3.0:1.0. Novolac resins have a molar ratio of formaldehyde to phenol, of less than to one to one. Such phenolic resins may be mixed with latex resins, for example acrylonitrile butadiene emulsions, acrylic emulsions, butadiene emulsions, butadiene styrene emulsions and combinations thereof.

3. Epoxy Resins

Epoxy resins have an oxirane group and are polymerized by the ring opening. Such epoxide resins include monomeric epoxy resins and polymeric epoxy reins. These resins can vary greatly in the nature of their backbones and substituent groups. For example, the backbone may be of any type normally associated with epoxy resins and substituent groups thereon can be any group free of an active hydrogen atom that is reactive with an oxirane ring at room temperature. Representative examples of acceptable substituent groups include halogens, ester groups, ether groups, sulfonate groups, siloxane groups, nitro groups and phosphate groups. Examples of some epoxy resins include 2,2-bis[4-(2,3-epoxypropoxy)-phenyl)propane (diglycidyl ether of bisphenol A)]. Other suitable epoxy resins include glycidyl ethers of phenol formaldehyde novolac.

4. Ethylenically Unsaturated Binder Precursors

Examples of ethylenically unsaturated binder precursors include aminoplast monomers or oligomers having pendant alpha, beta unsaturated carbonyl groups, ethylenically unsaturated monomers or oligomers, acrylated isocyanurate monomers, acrylated urethane oligomers, acrylated epoxy monomers or oligomers, ethylenically unsaturated monomers or diluents, acrylate dispersions or mixtures thereof.

The aminoplast binder precursors have at least one pendant alpha, beta-unsaturated carbonyl group per molecule or oligomer. These materials are further described in U.S. Pat. Nos. 4,903,440 and 5,236,472, both incorporated herein by reference.

The ethylenically unsaturated monomers or oligomers may be monofunctional, difunctional, trifunctional or tetrafunctional or even higher functionality. The term acrylate includes both acrylates and methacrylates. Ethylenically unsaturated binder precursors include both monomeric and polymeric compounds that contain atoms of carbon, hydrogen and oxygen, and optionally, nitrogen and the halogens. Oxygen or nitrogen atoms or both are generally present in ether, ester, urethane, amide, and urea groups. Ethylenically unsaturated compounds generally have a molecular weight of less than about 4,000 and may be esters made from the reaction of compounds containing aliphatic monohydroxy groups or aliphatic polyhydroxy groups and unsaturated carboxylic acids, such as acrylic acid, methacrylic acid, itaconic acid, crotonic acid, isocrotonic acid, maleic acid, and the like. Representative examples of ethylenically unsaturated monomers include methyl methacrylate, ethyl methacrylate, styrene, divinylbenzene, hydroxy ethyl acrylate, hydroxy ethyl methacrylate, hydroxy propyl acrylate, hydroxy propyl methacrylate, hydroxy butyl acrylate, hydroxy butyl methacrylate, vinyl toluene, ethylene glycol diacrylate, polyethylene glycol diacrylate, ethylene glycol dimethacrylate, hexanediol diacrylate, triethylene glycol diacrylate, trimethylolpropane triacrylate, glycerol triacrylate, pentaerthyitol triacrylate, pentaerythritol trimethacrylate, pentaerythritol tetraacrylate and pentaerythritol tetramethacrylate. Other ethylenically unsaturated resins include monoallyl, polyallyl, and polymethallyl esters and amides of carboxylic acids, such as diallyl phthalate, diallyl adipate, and N,N-diallyladipamide. Still other nitrogen containing compounds include tris(2-acryl-oxyethyl) isocyanurate, 1,3,5-tri(2-methyacryloxyethyl)-s-triazine, acrylamide, methylacrylamide, N-methyl-acrylamide, N,N-dimethylacrylamide, N-vinyl-pyrrolidone, and N-vinyl-piperidone.

Isocyanurate derivatives having at least one pendant acrylate group and isocyanate derivatives having at least one pendant acrylate group are further described in U.S. Pat. No. 4,652,274, incorporated herein after by reference. An example of an isocyanurate material is a triacrylate of tris(hydroxy ethyl) isocyanurate.

Acrylated urethanes are diacrylate esters of hydroxy terminated isocyanate extended polyesters or polyethers. Acrylated epoxies are diacrylate esters of epoxy resins, such as the diacrylate esters of bisphenol A epoxy resin.

Acrylated urethanes are diacrylate esters of hydroxy terminated NCO extended polyesters or polyethers. Acrylated epoxies are diacrylate esters of epoxy resins, such as the diacrylate esters of bisphenol A epoxy resin.

Examples of ethylenically unsaturated diluents or monomers can be found in U.S. Ser. No. 08/5,236,472 (Kirk et al.) and U.S. Ser. No. 08/144,199 (Larson et al.); the disclosures of both patent applications are incorporated herein after by reference. In some instances these ethylenically unsaturated diluents are useful because they tend to be compatible with water.

Additional details concerning acrylate dispersions can be found in U.S. Pat. No. 5,378,252 (Follensbee), incorporated herein after by reference.

It is also within the scope of this invention to use a partially polymerized ethylenically unsaturated monomer in the binder precursor. For example, an acrylate monomer can be partially polymerized and incorporated into the abrasive slurry. The degree of partial polymerization should be controlled such that the resulting partially polymerized ethylenically unsaturated monomer does not have an excessively high viscosity so that the resulting abrasive slurry can be coated to form the abrasive article. An example of an acrylate monomer that can be partially polymerized is isooctyl acrylate. It is also within the scope of this invention to use a combination of a partially polymerized ethylenically unsaturated monomer with another ethylenically unsaturated monomer and/or a condensation curable binder.

C. Additives

The abrasive coating of this invention can further comprise optional additives, such as, abrasive particle surface modification additives, coupling agents, plasticizers, fillers, expanding agents, fibers, antistatic agents, initiators, suspending agents, photosensitizers, lubricants, wetting agents, surfactants, pigments, dyes, UV stabilizers and suspending agents. The amounts of these materials are selected to provide the properties desired. Additives may also be incorporated into the binder, applied as a separate coating, held within the pores of the agglomerate, or combinations of the above.

1. Plasticizer

The abrasive coating may further comprise a plasticizer. In general, the addition of the plasticizer will increase the erodibility of the abrasive coating and soften the overall binder. The plasticizer should be in general compatible with the binder such that there is no phase separation. Examples of plasticizers include polyvinyl chloride, dibutyl phthalate, alkyl benzyl phthalate, polyvinyl acetate, polyvinyl alcohol, cellulose esters, phthalate, silicone oils, adipate and sebacate esters, polyols, polyols derivatives, t-butylphenyl diphenyl phosphate, tricresyl phosphate, castor oil, combinations thereof and the like.

2. Fillers

The abrasive coating can further optionally comprise a filler. Fillers may impart durability and stiffness to the coating. Conversely, in some instances with the appropriate filler and amount, the filler may increase the erodibility of the abrasive coating. A filler is a particulate material and generally has an average particle size range between 0.1 to 50 micrometers, typically between 1 to 30 micrometers. Fillers may be soluble, insoluble or swellable in a polishing liquid used in conjunction with the abrasive article. Generally, fillers are insoluble in such a polishing liquid. Examples of useful fillers for this invention include: metal carbonates (such as calcium carbonate (chalk, calcite, marl, travertine, marble and limestone), calcium magnesium carbonate, sodium carbonate, magnesium carbonate), silica (such as quartz, glass beads, glass bubbles and glass fibers) silicates (such as talc, clays, (montmorillonite) feldspar, mica, calcium silicate, calcium metasilicate, sodium aluminosilicate, sodium silicate) metal sulfates (such as calcium sulfate, barium sulfate, sodium sulfate, aluminum sodium sulfate, aluminum sulfate), gypsum, vermiculite, wood flour, aluminum trihydrate, carbon black, metal oxides (such as calcium oxide (lime), aluminum oxide, tin oxide (e.g. stannic oxide), titanium dioxide) and metal sulfites (such as calcium sulfite), thermoplastic particles (polycarbonate, polyetherimide, polyester, polyethylene, polysulfone, polystyrene, acrylonitrile-butadiene-styrene block copolymer, polypropylene, acetal polymers, polyurethanes, nylon particles) and thermosetting particles (such as phenolic bubbles, phenolic beads, polyurethane foam particles and the like). The filler may also be a salt such as a halide salt. Examples of metal fillers include, tin, lead, bismuth, cobalt, antimony, cadmium, iron titanium. Other miscellaneous fillers include sulfur, organic sulfur compounds, graphite and metallic sulfides. The above mentioned examples of fillers are meant to be a representative showing of fillers, and it is not meant to encompass all fillers.

3. Antistatic Agents

Examples of antistatic agents include graphite, carbon black, vanadium oxide, conductive polymers, humectants, and the like. These antistatic agents are disclosed in U.S. Pat. Nos. 5,061,294; 5,137,542, and 5,203,884, incorporated herein after by reference.

4. Curing Agent

The binder precursor may further comprise a curing agent. A curing agent is a material that helps to initiate and complete the polymerization or crosslinking process such that the binder precursor is converted into a binder. The term curing agent encompasses initiators, photoinitiators, catalysts and activators. The amount and type of the curing agent will depend largely on the chemistry of the binder precursor.

5. Surface Additives

In some instances an additive is included that modifies the surface of the abrasive particles or agglomerate. These additives may improve the dispersibility of the abrasive particles or agglomerate in the binder precursor and/or improve the adhesion to the binder precursor and/or the binder. Surface treatment may also alter and improve the cutting characteristics of the resulting abrasive particles or agglomerates. Surface treatment may also substantially lower the viscosity of the slurry used to prepare the abrasive article, thereby providing an easier manufacturing process. The lower viscosity also permits higher percentages of abrasive particles or agglomerates to be incorporated into a slurry.

Examples of suitable surface modification additives include wetting agents (also sometimes referred to as surfactants) and coupling agents. A coupling agent can provide an association bridge between the binder and the abrasive particles or agglomerates. The coupling agent may also provide an association bridge between the binder and the filler particles (to the extent present). Examples of suitable coupling agents include silanes, titanates, and zircoaluminates.

Surfactants may also be used as an additive. Examples of surfactants include metal alkoxides, polyalkylene oxides, salts of long chain fatty acids and the like. The surfactants may be cationic, anionic, amphoteric, or nonionic as long as the surfactant is compatible with both the abrasive particle or agglomerate and the binder precursor.

The abrasive particles or agglomerates may contain a surface coating to alter the abrading characteristics of the resulting abrasive. Suitable examples of such surface coatings are described, for example, in U.S. Pat. No. 5,011,508 (Wald et al.); U.S. Pat. No. 1,910,444 (Nicholson); U.S. Pat. No. 3,041,156 (Rowse et al.); U.S. Pat. No. 5,009,675 (Kunz et al.); U.S. Pat. No. 4,997,461 (Markhoff-Matheny et al.); U.S. Pat. No. 5,213,591 (Celikkaya et al.); U.S. Pat. No. 5,085,671 (Martin et al.); and U.S. Pat. No. 5,042,991 (Kunz et al.), the disclosures of which are incorporated herein by reference. The abrasive particles may also contain multiple coatings.

D. Backing

The abrasive article may have a backing provided with an abrasive coating. Generally, backings of abrasive articles are very uniform in thickness. Any of a variety of backing materials are suitable for this purpose, including both flexible backings and backings that are more rigid.

Examples of typical flexible abrasive backings include polymeric film, primed polymeric film, metal foil, cloth, paper, vulcanized fiber, nonwovens and treated versions thereof and combinations thereof. One type of backing is a polymeric film. Examples of such films include polyester films, polyester and co-polyester films, microvoided polyester films, polyimide films, polyamide films, polyvinyl alcohol films, polypropylene film, polyethylene film, polyethyleneterephthalate and the like. The thickness of the polymeric film backing generally ranges between about 20 to 1000 micrometers, for example between 50 to 500 micrometers and between 60 to 200 micrometers.

There should also be good adhesion between the polymeric film backing and the abrasive coating. In many instances, the coating surface of polymeric film backing is primed to improve adhesion. The primer can involve surface alteration or application of a chemical-type primer. Examples of surface alterations include corona treatment, UV treatment, electron beam treatment, flame treatment and scuffing to increase the surface area. Examples of chemical-type primers include ethylene acrylic acid copolymer as disclosed in U.S. Pat. No. 3,188,265, colloidal dispersion as taught in U.S. Pat. No. 4,906,523, incorporated herein by reference, aziridine-type materials as disclosed in U.S. Pat. No. 4,749,617 and radiation grafted primers as taught in U.S. Pat. Nos. 4,563,388 and 4,933,234.

Examples of more rigid backings include metal plates, ceramic plates, and the like. Another example of a suitable backing is described in U.S. Pat. No. 5,417,726 (Stout et al.) incorporated herein by reference. The backing may also consist of two or more backings laminated together, as well as reinforcing fibers engulfed in a polymeric material as disclosed in PCT publication WO 93/12911 (Benedict et al.).

Also suitable are backings in the form of an embossed polymeric film (e.g., a polyester, polyurethane, polycarbonate, polyamide, polypropylene, or polyethylene film) or embossed cellulosic backing (e.g., paper or other nonwoven cellulosic material). The embossed material can also be laminated to a non-embossed material to form the backing.

The backing may also contain a treatment to modify its physical properties. These treatment coats are well known in the abrasive art and include acrylate-based treatment coats, phenolic treatment coats and phenolic/latex treatment coats.

The backing may also be a foamed backing, e.g., a polymeric foam such as a polyurethane foam.

A pressure sensitive adhesive can be laminated to the nonabrasive side of the backing. Likewise, a foam substrate can be laminated to the backing. One portion of a mechanical mounting system may also be affixed to the backing.

In some instances, the back side or back surface of the backing may contain a friction coating. This friction coating may comprise a plurality of friction particles bonded to the backing by means of a friction coating binder. Friction particles may be any suitable material to create the desired coefficient of friction. Examples of suitable friction particles include both inorganic particles and organic particles, e.g., abrasive particles and/or filler particles. Alternatively, the friction coating may comprise a coating such as a urethane coating or a rough organic coating.

E. Other Additives

The slurry can further comprise additives such as abrasive particle surface modification additives, coupling agents, fillers, expanding agents, fibers, anti-static agents, initiators, suspending agents, lubricants, wetting agents, surfactants, pigments, dyes, UV stabilizers, complexing agents, chain transfer agents, accelerators, catalysts, and activators. The amounts of these materials are selected to provide the properties desired.

Expanding agents may be included to increase the erodibility of the abrasive article. The expanding agent can be any material that increases the volume of the abrasive coating. When an expanding agent is employed, the average particle size of the abrasive particles is generally less than 30 micrometers.

Examples of suitable expanding agents include steam, swelling solvents, nitrogen gas, carbon dioxide gas, air as a gas, pentane, hexane, heptane, butene, $CFCl_3$, $C_2F_3Cl_3$, vermiculite, toluene diisocyanate, 4,4'-diphenylmethane diisocyanate, hexamethylene diisocyanate, or polyurethane prepolymer which reacted with water to generate carbon dioxide gas. Other suitable expanding agents include a decomposition-type expanding agent such as ammonium carbonate, ammonium bicarbonate, sodium bicarbonate, dinitropentamethylenetetramine, azodicarbonamide, azobisisobutylonitrile, hydradine compounds such as maleic acid hydrazide, oxalic acid hydrazide, benzenesulfonyl hydrazide, toluenesulfonyl hydrazide, p,p'-hydroxy bis (benzene-sulfonyl hydrazide), and t-alkylhydrazonium salt. Two or more expanding agents may be used in combination with each other. Others are described in U.S. Pat. No. 5,203,884, incorporated herein by reference.

Examples of suitable lubricants include metal salts of fatty acids (e.g., zinc stearate, calcium stearate, and lithium stearate), graphite, waxes, glycol ethers, glycerine, silicone compounds, combinations thereof and the like. Encapsulated lubricants may also be used, e.g., as described in U.S. Pat. No. 3,502,453 (Baratto) incorporated herein by reference.

Examples of chain transfer agents include carbon tetrabromide and other chain transfer agents.

Examples of complexing agents include ammonium salts such as $NH_4HCO_3$, tannic acid, catechol, $Ce(OH)(NO_3)$; $Ce(SO_4)_2$, phthalic acid, salicyclic acid and the like. These complexing agents may be in the form of particulates that can be added to the slurry.

Water and/or organic solvent can be incorporated into the slurry. The amount of water and/or organic solvent is selected to achieve the desired coating viscosity. In general, the water and/or organic solvent should be compatible with the binder precursor. The water and/or solvent may be removed following polymerization of the precursor, or it may remain with the binder. Water soluble and/or water sensitive additives such as polyvinyl alcohol, polyvinyl acetate, cellulosic based particles and the like may also be included to increase the erodibility of the abrasive surface.

Method of Use

The present invention can be used to abrade and/or polish a wide range of workpiece surfaces. These workpiece surfaces include metal, metal alloys, exotic metal alloys, ceramics, glass, wood, wood like materials, composites, painted surface, plastics (including thermoplastics and reinforced thermoplastics), stones, glass surfaces including glass television screens, optical components such as fiber optic connectors, windows, glass display shelves, and mirrors. The abrasive article may also be used to clean surfaces such as household items, furniture, walls, sinks, bathtubs, showers, and floors. In specific instances, the workpiece surface may include carbides, ceramics, nitrides and ferrite. More specifically, the workpiece includes aluminum titanium carbide and tungsten carbide surface as described in U.S. Pat. No. 6,171,224. In certain embodiments, the workpiece is a computer hard disk drive head, also called a slider. Such a method is disclosed in U.S. Pat. No. 5,733,178 to Ohishi, which is herein incorporated by reference in its entirety.

As known by those skilled in the art, disk drive heads are manufactured on a ceramic wafer in a layered construction. The layered construction is sawn, or cut, and the sawn surface contains the read/write element. The read/write element is lapped to set the gap geometry and the pole tip recession. Each lap being an article used in the operation may be a distinct diameter, typically approximately about 16 inches in diameter. A row of heads is presented to the lapping film, typically using a fixturing device to establish the head geometry. The read/write element is then lapped to a predetermined geometry and finish. The articles of the present invention may be used in at least the first step of a multi-step process for polishing the aforementioned hard disk drive heads. It is also contemplated that the articles of the invention could also be used in any of a number of the steps in the multi-step finishing process.

The workpiece may be flat or may have a shape or contour associated with it. Examples of specific workpieces include ophthalmic lenses, glass television screens, metal engine components (including cam shafts, crankshafts, engine blocks and the like), hand tools metal forgings, fiber optic components, caskets, furniture, wood cabinets, turbine blades, painted automotive components, bath tubs, showers, sinks, and the like.

In a specific example, the abrasive article may be useful in optical component polishing. An optical component is defined as any part of an optical device that alters the properties of an incoming optical signal, redirects or transmits the signal. Examples of optical components include, but are not limited to lenses, collimators, gradient index lenses, optical fibers, an array of optical fibers, couplers, waveguides, polarizers, Faraday rotators, fiber gratings, polarizing crystals, garnet crystals, cross connects and splitters. An optical device is any device that combines one or more optical components to alter the properties of the optical signal, redirect or transmit the signal. For example, fiber optic connectors, emitters, transmitters, repeaters, receivers, modulators, attenuators, couplers, isolators, amplifiers, waveguides, multiplexers, demultiplexers, routers and switches are all optical devices under this definition. Examples of other optical components and optical devices can be found in *The Photonics Buyers' Guide, Book* 2, 2001 Edition, Laurin Publishing, Pittsfield, Mass.

Optical components may be formed from many different materials. For example, the optical component may be silicon, a silica doped material or silica glass. The optical component may also be doped silica, for example a rare earth doped silica, erbium doped silica, germanium doped silica or erbium ytterbium doped silica. Other examples include gallium arsenide, indium gallium arsenide, germanium, indium gallium arsenide phosphide, fluorozirconate, indium phosphide, electro-optic switching material such as lithium niobate and potassium dihydrogen phosphate, solid state laser media such as ruby and Alexandrite, calcite, garnet, rare earth doped garnet. Some optical devices are formed from ceramic surfaces, including calcium titanate, ceria-zirconia or aluminum oxy-nitride.

The abrasive article is positioned between a support and the workpiece surface and pressure is applied by the support so that contact is made between the abrasive member and the workpiece surface. The support may be any known lapping, single side flat lapping or polishing machine. The support may include a soft back-up pad with a durometer of about 40 to about 90 Shore A. In other embodiments, the support may include a hard backing, such as materials with a durometer of over 100 Shore A, for example glass, plastics or metal. The pressure applied is generally between about 2 and about 250 grams/mm$^2$. The abrasive article and the workpiece surface are moved relative to one another to finish the surface. The abrasive may either rotate on the workpiece surface or oscillate back and forth over the workpiece surface, or both. Generally, the abrasive moves over the workpiece between about 20 and about 300 times per minute to achieve a desired surface. The desired surface may be a certain desired shape, such as a flat surface or a radius of curvature. The desired surface may also be a desired surface finish. In one example, a lithium niobate polish, the desired surface finish appears scratch-free to the human eye at a magnification of 100 times.

In some embodiments, the abrasive may be conditioned prior to use. In a conditioning step, the top layers of the abrasive article, generally binder, are removed. In order to accomplish this objective, the abrasive must be put in contact with a conditioning pad, such as an additional abrasive article, which will move against the abrasive and remove a layer on the surface. The conditioning step exposes abrasive particles so that polishing begins as soon as the abrasive article comes into contact with the workpiece.

Depending upon the application, there may be a polishing liquid present at the interface between the abrasive article and the workpiece. This liquid can be water and/or an organic solvent. The polishing liquid may further comprise additives such as lubricants, oils, emusilified organic compounds, cutting fluids, soaps and the like. The abrasive article may oscillate at the polishing interface during use.

The abrasive article of the invention can be used by hand or used in combination with a machine. For example, the abrasive article may be secured to a random orbital tool or a rotary tool. At least one or both of the abrasive article and the workpiece is moved relative to the other.

EXAMPLES

Materials

Ludox LS: Colloidal silica sol containing 30% by weight silica suspended in water, distributed by Sigma-Aldrich Corporation of St. Louis, Mo.

Diamond: 1 micrometer diamond powder obtained from American Boarts Crushing Co. Inc of Boca Raton, Fla.

SDS: sodium diamyl sulfosuccinate, available under the tradename CYANSOL AY, from Cytec Industries of West Paterson, N.J.

MEK: methyl ethyl ketone.

Example 1

Abrasive articles were prepared by mixing 1200 g of Ludox LS, (obtained from Sigma-Aldrich Corporation of St. Louis, Mo.) with 180 g of diamond with mean size of 1 micrometer (obtained from American Boarts Crushing Co. Inc of Boca Raton, Fla.). The mixture is thoroughly mixed for 30 minutes in an ultrasonic bath. The resulting feed is pumped into a Mobile Miner 2000 centrifugal atomizer obtained from Niro Corporation of Soeborg, Denmark. The atomizer wheel was driven at a nominal rotational speed was 37,500 rpm. Hot air at a temperature of 200° C. was used to dry the particles. The outlet temperature, measured at the outlet of the atomizing chamber was maintained at 95° C. The feed flow rate was used to control the temperature. The particles were fired at a temperature of 500° C. The agglomerates' nominal bulk and tap densities are reported in Table 2.

Example 2

An abrasive article was prepared as in Example 1 except that the slurry comprised 1200 g of Ludox LS, 180 g of diamond with nominal size of 1 micrometer, 1.8 g of sodium diamyl sulfosuccinate, obtained from Cytec Industries of West Paterson, N.J., and 1.8 g of methyl ethyl ketone. The resulting agglomerates' nominal bulk and tap densities are reported in Table 2.

Example 3

An abrasive article was prepared as in Example 1 except that the slurry comprised 1200 g of Ludox LS, 180 g of diamond with nominal size of 1 micrometer, 3.6 g of sodium diamyl sulfosuccinate, obtained from Cytec Industries of West Paterson, N.J., and 3.6 g of methyl ethyl ketone. The resulting agglomerates' nominal bulk and tap densities are reported in Table 2.

Example 4

An abrasive article was prepared as in Example 1 except that the slurry comprised 1200 g of Ludox LS, 180 g of diamond with nominal size of 1 micrometer, 5.4 g of sodium diamyl sulfosuccinate, obtained from Cytec Industries of West Paterson, N.J., and 5.4 g of methyl ethyl ketone. The resulting agglomerates' nominal bulk and tap densities are reported in Table 2.

TABLE 1

| Sample | Ludox LS | 1 micrometer Diamond | SDS | MEK |
|---|---|---|---|---|
| Example 1 | 1200 g | 180 g | 0 g | 0 g |
| Example 2 | 1200 g | 180 g | 1.8 g | 1.8 g |
| Example 3 | 1200 g | 180 g | 3.6 g | 3.6 g |
| Example 4 | 1200 g | 180 g | 5.4 g | 5.4 g |

The examples were tested for bulk density. Bulk density is determined by measuring the weight of a given volume of agglomerates. The examples were also tested for tap density. Tap density on the other hand is measured by compacting a given weight of agglomerates to its minimum volume. The compaction was done in a 10 ml graduated cylinder using a Syntron Jogger (model J-1B) obtained from FMC Corporation of Homercity Pa. All the samples showed no change in volume after 4 minutes of vibration. Both the bulk density measurements and the tap density measurements are obtained by dividing the weight by the volume. The bulk density and the tap density are reported in Table 2.

355 g of MEK, 4.0 grams of SDS (diluted to 50% solids in MEK), 6.0 g of Pylam Liquid Purple Oil LX 11096 (commercially available from Pylam Products Co, Inc., Tempe, Ariz.), and 3.0 g of Pylam Automate Blue (commercially available from Pylam Products Co, Inc., Tempe, Ariz.) were blended in a stainless steel pot. The blend was mixed for 10 minutes under ultrasonic conditions. 500 g of the agglomerates as detailed above were added to the blend and stirred. Then 818 g of Phenoxy YP-50S (diluted to 28% solids in MEK, commercially available from Tohto Kasai Co., Japan), 47 g of toluene, 280 g of a polyurethane resin comprising neopentyl glycol, poly-epsilon-caprolactone and 4'-diphenyl methane diisocyanate (diluted to 35% solids in MEK), 40 g of a phosphorylated polyalkoxy polyol ("POCA") dispersant as described in U.S. Pat. No. 5,028,483 to Chernega et al. (diluted to 75% solids in MEK), and 142 g of polyisocyanate pre-polymer MRS (commercially available from Bayer Corp., Pittsburgh, Pa.) were added to the blend in sequential order and mixed 10 minutes between each addition to yield a slurry.

The slurry was coated onto a 5 mil (127 micrometer) polyethyleneterephthalate film primed with an aziridine containing layer as described in U.S. Pat. No. 5,057,371, to Canty et al., which is herein incorporated by reference. The finished coating weight of the dried solution is 12–15 mg./per square inch or a range of about 25.4 to about 30.4 micrometers thickness of the dried solution. The coated abrasive was then cured in an oven for about 24 hours at about 118° C. The abrasive sheet was then converted into abrasive article squares (10 cm×10 cm).

Testing of the coated abrasive was done by abrading a tungsten carbide workpiece with the lapping film. An internally designed rotational flat lapping machine was used for this test procedure. A 4 inch by 4 inch piece of abrasive was secured onto the base of the machine and a workpiece of tungsten carbide was secured in contact with the abrasive. A pressure of 38 lb/in$^2$ (262 kPa) is applied to the workpiece and the test cycle is run for 5000 rotations at a rate of 300 rpm. Water was the lubricant for the abrading process. The total stock removal on the workpiece is disclosed in Table 2.

Comparative Example C1

Agglomerates were manufactured as in Example 8 U.S. Pat. No. 3,916,584 to Howard with the exception that the diamond in Comparative Example C1 was 1 micron diamond. These agglomerates were then tested for bulk density and tap density. The agglomerates were formed into an abrasive article as in Examples 1–4. Stock removal was measured for multiple coated abrasives and a range reported. The results are shown in Table 2.

Normalized Bulk Density

The normalized bulk density was calculated by dividing the bulk density measurement by the theoretical density. The theoretical density was calculated by the rule of mixture.

$$\rho = \sum_{i=1}^{n} \rho_i v_i / V$$

Where $\rho_i$ is the density of component i, $v_i$ is the volume of component I, and V is the total volume of the agglomerate. The density of diamond used was 3.5 g/cc. The density of silica used was 2.5 g/cc. No other materials were present in the finished agglomerate. The theoretical bulk density for all example particles is determined to be 2.75 g/cc.

TABLE 2

| Sample | Bulk Density | Tap Density | Total Stock Removal | Normalized Bulk Density |
|---|---|---|---|---|
| Example 1 | 0.832 g/cc | 0.967 g/cc | 196 mg | 0.305 |
| Example 2 | 0.618 g/cc | 0.772 g/cc | 154 mg | 0.225 |
| Example 3 | 0.579 g/cc | 0.697 g/cc | 135 mg | 0.211 |
| Example 4 | 0.541 g/cc | 0.677 g/cc | 125 mg | 0.197 |
| C1 | 1.046 g/cc | 1.189 g/cc | 120–169 mg | 0.380 |

It was surprising and unexpected to find that the lower normalized bulk density in the examples of this invention yield equivalent or better stock removal. Additionally, it was surprising to discover that articles of the invention can be tailored to match the stock removal requirements of a given process.

Example 5

The agglomerates were made as in Example 1. 355 g of MEK, 4.0 grams of SDS (diluted to 50% solids in MEK), 6.0 g of Pylam Liquid Purple Oil LX 11096 (commercially available from Pylam Products Co, Inc., Tempe, Ariz.), and 3.0 g of Pylam Automate Blue (commercially available from Pylam Products Co, Inc., Tempe, Ariz.) were blended in a stainless steel pot. The blend was mixed for 10 minutes under ultrasonic conditions. 500 g of the agglomerates were added to the blend and stirred. Then 818 g of Phenoxy YP-50S (diluted to 28% solids in MEK, commercially available from Tohto Kasai Co., Japan), 47 g of toluene, 280 g of a polyurethane resin comprising neopentyl glycol, poly-epsilon caprolactone and 4'-diphenyl methane diisocyanate (diluted to 35% solids in MEK), 40 g of phosphorylated polyalkoxy polyol ("POCA") dispersant as described in U.S. Pat. No. 5,028,483 to Chernega et al. (diluted to 75% solids in MEK), and 142 g of polyisocyanate pre-polymer MRS (commercially available from Bayer Corp., Pittsburgh, Pa.) were added to the blend in sequential order and mixed 10 minutes between each addition to yield a slurry.

The slurry was coated onto a 5 mil (127 micrometer) polyethyleneterephthalate film primed with an aziridine containing layer as described in U.S. Pat. No. 5,057,371, to Canty et al., which is herein incorporated by reference. The slurry was coated at 1.7 mil (43 micrometer) at 40 ft/min (12 meters/minute) and cured in a forced air oven via a gradient cure between 180° F. (82° C.) to a maximum of 245° F. (118° C.) for a total of 4 minutes. The resulting abrasive sheet is then post-cured at 165° F. (74° C.) for 24 hours. The abrasive sheet was then converted into abrasive article discs with a diameter of 11 cm.

Pre-weighed fiber optic connectors (ST model) (commercially available under the tradename 3M ST CONNECTOR TYPE OFNR, 2.5 mm ferrule, from 3M Company, Saint Paul, Minn.) were polished with the abrasive article disc for 46 minutes using a Seiko OFL 12 (commercially available from Seiko Instruments USA, Inc., Torrance, Calif.) equipped with a 60 durometer backup pad and a pressure setting of 1. Deionized water was used as a lubricant. At certain times in the polishing, as detailed in Table 3, the polishing was halted. The fiber optic connectors were wiped until dry, wiped with isopropyl alcohol, dried with a low lint cloth and re-weighted. The total amount of material removed is shown in Table 3.

Comparative Examples C2–C4

The process was repeated for following commercially available lapping films: Comparative Example C2 is 3M 1 micron 662XW TH IMPERIAL Diamond Lapping Film (commercially available from 3M Company, Saint Paul. Minn.); Comparative Example C3 is Myco 1 micron ULTRALAP Diamond Lapping Film (commercially available from MYCO Precision Abrasive, Inc. Montgomeryville, Pa.); and Comparative Example C4 is ANGSTROMLAP 1 micron D1 Diamond Lapping Film (commercially available from Fiber Optic Center, New Bedford, Mass.). The total amount of material removed is shown

TABLE 3

| Time (minutes) | Example 5 | Comparative Example C2 | Comparative Example C3 | Comparative Example C4 |
| --- | --- | --- | --- | --- |
| 0 | 0 mg | 0 mg | 0 mg | 0 mg |
| 3 | 1.4 mg | 17 mg | 1.1 mg | 1.4 mg |
| 6 | 2.9 mg | 2.9 mg | 2.4 mg | 2.1 mg |
| 9 | 4.7 mg | 3.7 mg | 3.5 mg | 2.8 mg |
| 15 | 8.3 mg | 4.9 mg | 5.5 mg | 3.4 mg |
| 21 | 12.1 mg | 6 mg | 7.1 mg | 3.8 mg |
| 27 | 16.5 mg | 6.8 mg | 8.4 mg | 3.9 mg |
| 33 | 21.5 mg | 6.9 mg | 9.4 mg | Not tested |
| 39 | 26.1 mg | Not tested | 10.7 mg | Not tested |
| 45 | 30.5 mg | Not tested | 12 mg | Not tested |

Table 3 indicates that the abrasive article of the present invention has a more consistent cut rate for a longer time than commercially available abrasive articles.

What is claimed is:

1. A method of manufacturing an agglomerate comprising:
    forming a mixture comprising an abrasive particle with a sol, the sol comprising an oxide and water;
    introducing the mixture into a spray dryer;
    drying the mixture in the spray dryer to form loose greenware agglomerates; and
    firing the greenware agglomerates,
    wherein the agglomerates comprise abrasive particles retained within a crystalline matrix of the oxide.

2. A method of manufacturing a coated abrasive article comprising:
    forming a mixture comprising an abrasive particle with a sol, the sol comprising an oxide and water;
    introducing the mixture into a spray dryer;
    drying the mixture in the spray dryer to form loose greenware agglomerates;
    firing the greenware agglomerates to form agglomerates, wherein the agglomerates comprise abrasive particles retained within a crystalline matrix of the oxide;
    mixing the agglomerates with a binder precursor to form a slurry;
    coating the slurry on a major surface of a backing; and
    curing the binder precursor.

3. A method of manufacturing a three dimensional fixed abrasive article comprising:
    forming a mixture comprising an abrasive particle with a sol, the sol comprising an oxide and water;
    introducing the mixture into a spray dryer;
    drying the mixture in the spray dryer to form loose greenware agglomerates;
    firing the greenware agglomerates to form agglomerates, wherein the agglomerates comprise abrasive particles retained within a crystalline matrix of the oxide;
    mixing the agglomerates with a binder precursor to form a slurry;
    applying the slurry to a production tool comprising cavities; and
    curing the binder precursor.

4. A method of polishing a workpiece comprising:
    providing an workpiece;
    bringing the workpiece in contact with a coated abrasive article, the coated abrasive article comprising agglomerate particles, the agglomerate particles comprising a crystalline matrix of an oxide;
    abrasive particles; and
    a normalized bulk density less than about 0.38; and
    moving the workpiece relative to the coated abrasive article.

5. The method of claim 4 wherein the workpiece comprises an optical component.

6. The method of claim 5 wherein the optical component is selected from a lens, a collimator, a gradient index lens, an optical fiber, an array of optical fibers, a coupler, a waveguide, a polarizer, a Faraday rotator, a fiber grating, polarizing crystals, garnet crystals, an optical switch, a cross connect or a splitter.

7. The method of claim 4 wherein the workpiece comprises an optical device.

8. The method of claim 7 wherein the optical device is a fiber optic connector.

9. The method of claim 4 wherein the workpiece comprises a material selected from silicon, a silica doped material, silica glass, a doped silica, a rare-earth doped silica, crystalline quartz, gallium arsenide, indium gallium arsenide, germanium, indium gallium arsenide phosphide, lithium niobate, potassium dihydrogen phosphate, solid-state laser media, fluorozirconate, indium phosphide, calcite, garnet, rare-earth doped garnet, ceramic surfaces, or combinations thereof.

10. The method of claim 4 wherein the workpiece is a ceramic.

11. The method of claim 4 wherein the workpiece comprises a hard disk drive head.

12. An agglomerate particle comprising
a crystalline matrix of an oxide;
abrasive particles; and
wherein the agglomerate has a normalized bulk density less than about 0.38.

13. A coated abrasive article comprising the agglomerate of claim 12.

14. The coated abrasive article of claim 13 wherein the coated abrasive is a lapping film.

15. A three dimensional fixed abrasive article comprising the agglomerate of claim 12.

16. The agglomerate of claim 12 wherein the normalized bulk density is between about 0.19 and about 0.35.

17. The agglomerate of claim 12 wherein the normalized bulk density is between about 0.25 to about 0.31.

* * * * *

UNITED STATES PATENT AND TRADEMARK OFFICE
CERTIFICATE OF CORRECTION

PATENT NO. : 6,645,624 B2
DATED : November 11, 2003
INVENTOR(S) : Adefris, Negus B.

It is certified that error appears in the above-identified patent and that said Letters Patent is hereby corrected as shown below:

<u>Column 10,</u>
Lines 59-60, delete "U.S. Ser. No. 08/5,236,472 (Kirk et al.) and U.S. Ser. No. 08/144,199 (Larson et al.)" and insert -- U.S. Patent No. 5,236,472 (Kirk et al.) and WO 95/11774 (Larson et al.) --

Signed and Sealed this

Twenty-seventh Day of July, 2004

JON W. DUDAS
*Acting Director of the United States Patent and Trademark Office*